United States Patent [19]

Tamanoi

[11] Patent Number: 5,565,885
[45] Date of Patent: Oct. 15, 1996

[54] LIQUID CRYSTAL DISPLAY PANEL AND LIQUID CRYSTAL DISPLAY DEVICE

[75] Inventor: Yutaka Tamanoi, Kawasaki, Japan

[73] Assignee: Kabushiki Kaisha Toshiba, Kawasaki, Japan

[21] Appl. No.: 258,379

[22] Filed: Jun. 10, 1994

Related U.S. Application Data

[63] Continuation of Ser. No. 74,974, Jun. 10, 1994, abandoned, which is a continuation of Ser. No. 700,414, May 15, 1991, abandoned.

[30] Foreign Application Priority Data

May 16, 1990 [JP] Japan ................................. 2-125702

[51] Int. Cl.$^6$ ............................................. G02F 1/1343
[52] U.S. Cl. .......................... 345/100; 345/905; 359/83; 359/88
[58] Field of Search ................................. 345/905, 100, 345/98, 104, 101; 359/88, 87, 83, 62, 57

[56] References Cited

U.S. PATENT DOCUMENTS

| | | | |
|---|---|---|---|
| 4,655,551 | 4/1987 | Washizuka et al. | 359/83 |
| 4,684,974 | 8/1987 | Matsunaga et al. | 340/718 |
| 4,687,300 | 8/1987 | Kubo et al. | 340/765 |
| 4,766,426 | 8/1988 | Hatada et al. | 340/718 |
| 4,772,100 | 9/1988 | Suenaga . | |
| 4,832,455 | 5/1989 | Takeno et al. | 359/88 |
| 4,836,651 | 6/1989 | Anderson | 359/88 |
| 4,840,459 | 6/1989 | Strong | 359/88 |
| 4,862,153 | 8/1989 | Nakatani et al. | 340/718 |
| 4,896,946 | 1/1990 | Suzuki et al. | 359/88 |
| 4,917,466 | 4/1990 | Nakamura et al. | 359/88 |
| 5,016,986 | 5/1991 | Kawashima et al. | 359/87 |
| 5,028,916 | 7/1991 | Ichikawa et al. | 340/784 |
| 5,042,919 | 8/1991 | Yabu et al. | 359/88 |
| 5,049,866 | 9/1991 | Miyajima | 340/765 |
| 5,117,300 | 5/1992 | Wiemer | 359/87 |
| 5,293,262 | 3/1994 | Adachi et al. | 359/88 |

FOREIGN PATENT DOCUMENTS

| | | |
|---|---|---|
| 62-164027 | 7/1987 | Japan . |
| 63-98636 | 4/1988 | Japan . |
| 63-170618 | 7/1988 | Japan . |

OTHER PUBLICATIONS

HV57, HV58, Super tex Inc., pp. 11–130 to pp. 11–134, 1988.

*Primary Examiner*—Steven Saras
*Attorney, Agent, or Firm*—Finnegan, Henderson, Farabow, Garrett & Dunner, L.L.P.

[57] ABSTRACT

A liquid crystal display panel includes first wirings, through which driving voltages for driving the liquid crystal are applied, and second wirings, through which various control signals, data signals, and voltages, which are to be transmitted/applied between the semiconductor integrated circuits for generating the driving voltages, are transmitted/applied.

4 Claims, 3 Drawing Sheets

LIQUID CRYSTAL DISPLAY PANEL AND LIQUID CRYSTAL DISPLAY DEVICE

This application is a continuation of application Ser. No. 08/074,974 filed Jun. 10, 1994, now abandoned, which is a continuation of application Ser. No. 07/700,414 filed May 15, 1991, now abandoned.

BACKGROUND OF THE INVENTION

1. Field of the Invention

The present invention relates to a liquid crystal display panel and a liquid crystal display device using the liquid crystal display panel.

2. Description of the Related Art

A liquid crystal display panel includes two glass panels, between which a liquid crystal is sandwiched and on each of which a plurality of transparent electrodes (or wirings) are arranged in order. In a liquid crystal display device, a printed circuit board, on which a plurality of semiconductor integrated circuit (IC) chips and the like for driving the liquid crystal display panel are mounted, is arranged around the panel. The transparent wirings of the liquid crystal display panel are applied with the driving voltages generated by the semiconductor IC chips, thus causing the display panel to perform a display operation.

In a conventional liquid crystal display device, a plurality of semiconductor IC chips are mounted on a printed circuit board, and patterns of control signal wirings, power supply wirings, etc. which are used for controlling the timing at which the semiconductor IC chips are driven, are formed on the printed circuit board.

Recently, the number of semiconductor IC chips for driving liquid crystal display panels has been increasing in accordance with increases in the size of the display panels. The number of wirings used for signal transmissions between semiconductor IC chips mounted on a printed circuit board has been correspondingly increasing, which necessitates an increase in the size of the printed circuit board. However, the use of a large printed circuit board results in a large and heavy liquid crystal display device produced at high cost.

Moreover, in connection with an increase in the panel size, another requirement is to check the differences in the characteristics of a plurality of liquid crystal display panels, which may result from differences in the conditions, as well as to check electric characteristics such as signal delay in wirings when liquid crystal display panels are applied with liquid crystal driving voltages generated by liquid crystal driving IC chips. However, since a conventional liquid crystal display panel does not have wirings other than those for application of the driving voltages, the operation characteristics of the display panel cannot be externally monitored.

As mentioned above, a conventional liquid crystal display panel has the drawback that the operation characteristics of the display panel and electric characteristics such as signal delay in wirings cannot be externally monitored.

Further, a conventional liquid crystal display device is large in size, heavy, and high in cost, owing to an increase in the panel size.

SUMMARY OF THE INVENTION

It is the first object of the present invention to provide a liquid crystal display panel wherein the operation characteristics thereof can be externally monitored.

It is the second object of the present invention to provide a compact, thin, and light liquid crystal display device of low cost which does not require a printed circuit board on which a plurality of liquid crystal driving IC chips are mounted.

According to the present invention, there is provided a liquid crystal display panel comprising: a pair of glass panels, each of which has two major surfaces; a liquid crystal sandwiched between the glass panels so as to be in contact with one major surface of each of the glass panels; a plurality of first light-transmitting wiring means, formed on each of those major surfaces of the glass panels which are in contact with the liquid crystal, and through which a voltage for driving the liquid crystal is applied; and at least one second light-transmitting wiring means formed on at least one of those major surfaces which are in contact with the liquid crystal.

Further, according to the present invention, there is provided a liquid crystal display device comprising: a liquid crystal display panel including a pair of glass panels each of which has two major surfaces, a liquid crystal sandwiched between the glass panels so as to be in contact with one major surface of each of the glass panels, a plurality of first light-transmitting wiring means, formed on each of those major surfaces of the glass panels which are in contact with the liquid crystal, and through which a plurality of voltages for driving the liquid crystal are applied, and at least one second light-transmitting wiring means formed on at least one of those major surfaces which are in contact with the liquid crystal; and a plurality of integrated circuit chips for generating the voltages for driving the liquid crystal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Embodiments of the present invention will now be described in detail, with reference to the drawings.

Figure 1:
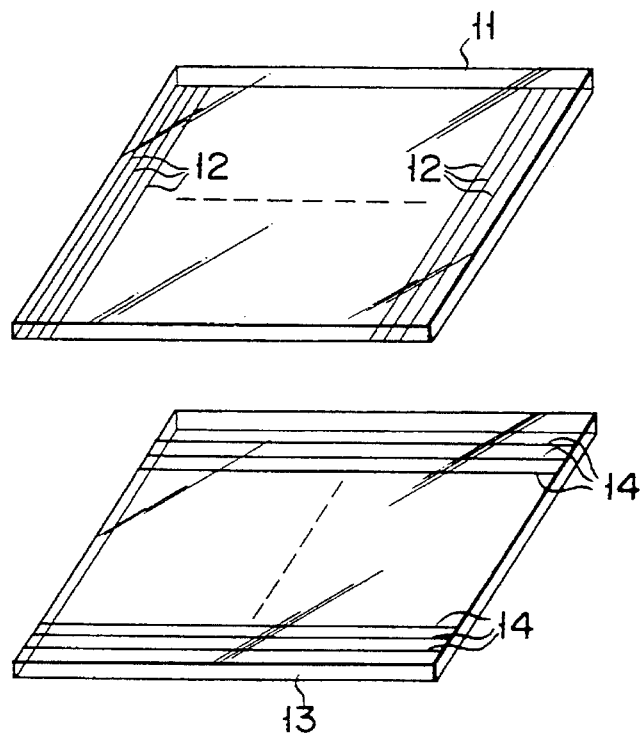
FIG. 1 is an oblique view of two glass panels used in the liquid crystal display panel of the present invention.

FIG. 1 is an oblique view of two glass panels used in the liquid crystal display panel of the present invention. A plurality of liquid crystal driving voltage wirings 12, which are transparent, are formed at equal intervals on a surface of one glass panel 11. Likewise, a plurality of liquid crystal driving voltage wirings 14, which are transparent, are formed at equal intervals on a surface of the other glass panel 13. The wirings 12 are called, in this case, scanning wirings, while the wirings 14 are called signal wirings.

Figure 2:
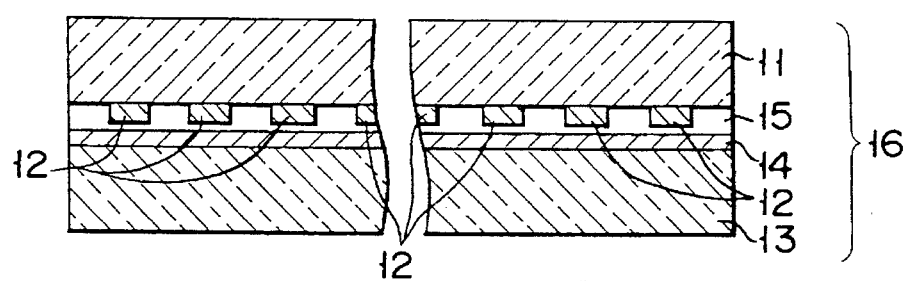
FIG. 2 is a cross-sectional view of the liquid crystal display panel which employs the glass panels shown in FIG. 1.

As is shown in FIG. 2, the two glass panels 11 and 13 are affixed to each other with a liquid crystal 15 sandwiched therebetween, thus forming a liquid crystal panel 16. More precisely, the glass panels 11 and 13 are affixed to each other such that the wirings 12 on the glass panel 11 and wirings 14 on the glass panel 13 are located inward and in contact with the liquid crystal 15, and such that the wirings 12 cross the wirings 14.

Further, a plurality of display segments are formed on the regions where the wirings 12 cross the wirings 14.

Figure 3:
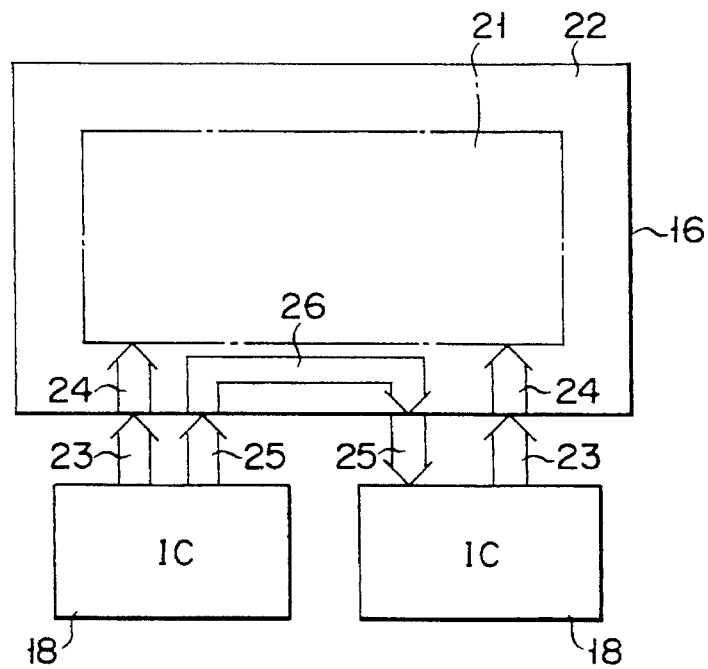
FIG. 3 is a block diagram of the liquid crystal display device according to a first embodiment of the present invention and employing the liquid crystal display panel shown in FIG. 2.

FIG. 3 shows the liquid crystal display device using the above-mentioned liquid crystal panel 16, according to the first embodiment of the present invention. A plurality of semiconductor integrated circuit (IC) chips 18 (only two of them are shown in the drawings) are formed around the panel 16 such that they surround the panel. These IC chips 18 are of the tape automated bonding (TAB) type, and the electrode pads of the IC chips are coupled to the wirings formed on insulating resin films (not shown). The IC chips 18 generate the liquid crystal driving voltages, i.e., a scanning voltage and a signal voltage, which are applied to the liquid crystal driving voltage wirings mentioned above.

The liquid crystal display panel 16 has a first region 21 in which the liquid crystal is provided between the two glass panels and a large number of display pixels are formed, and a second region 22 in which the liquid crystal is not present between the two glass panels.

The liquid crystal driving voltages generated by the semiconductor IC chips 18 are applied to wiring groups 24 consisting of the wirings 12 or 14 of the liquid crystal display panel 16, through wiring groups 23 consisting of a plurality of liquid crystal driving voltage wirings formed on the above-mentioned insulating resin films.

In addition to the wiring groups 23, wiring groups 25 consisting of a plurality of wirings are formed on the insulating resin films. Wiring groups 25 are electrically connected to one another by a wiring group 26 consisting of a plurality of wirings which are provided on the liquid crystal display panel 16 and which are made of the same material as that of the wirings 12 and 14, e.g. ITO (Indium.TIN.oxide).

Various control signals and voltages which are necessary for the operation of the semiconductor IC chips 18 are transmitted/applied to the IC chips 18 through the wiring groups 25 and 26. The signals as transmitted through the wiring groups 25 and 26 are, for example, control signals such as a shift clock signal, a frame signal, a latch signal, an enable signal and a data signal. The voltages as transmitted through a wiring groups 25 and 26 are, for example, a ground voltage of e.g. 0 V, a high voltage of e.g. 5 V for a logical operation, a high lighting voltage of e.g. 0 V for a liquid crystal drive, a high non-lighting voltage to e.g. −4 V for a liquid crystal drive, a low non-lighting voltage of e.g. −26 V for a liquid crystal drive, and a low lighting voltage of e.g. −30 V for a liquid crystal drive.

As shown in the drawings, the wiring group 26 is formed in the aforementioned second region 22 in which the liquid crystal is not present, so that the various control signals and voltages transmitted/supplied through the wiring groups 26 do not adversely affect a display operation performed by the liquid crystal display panel.

Figure 4:
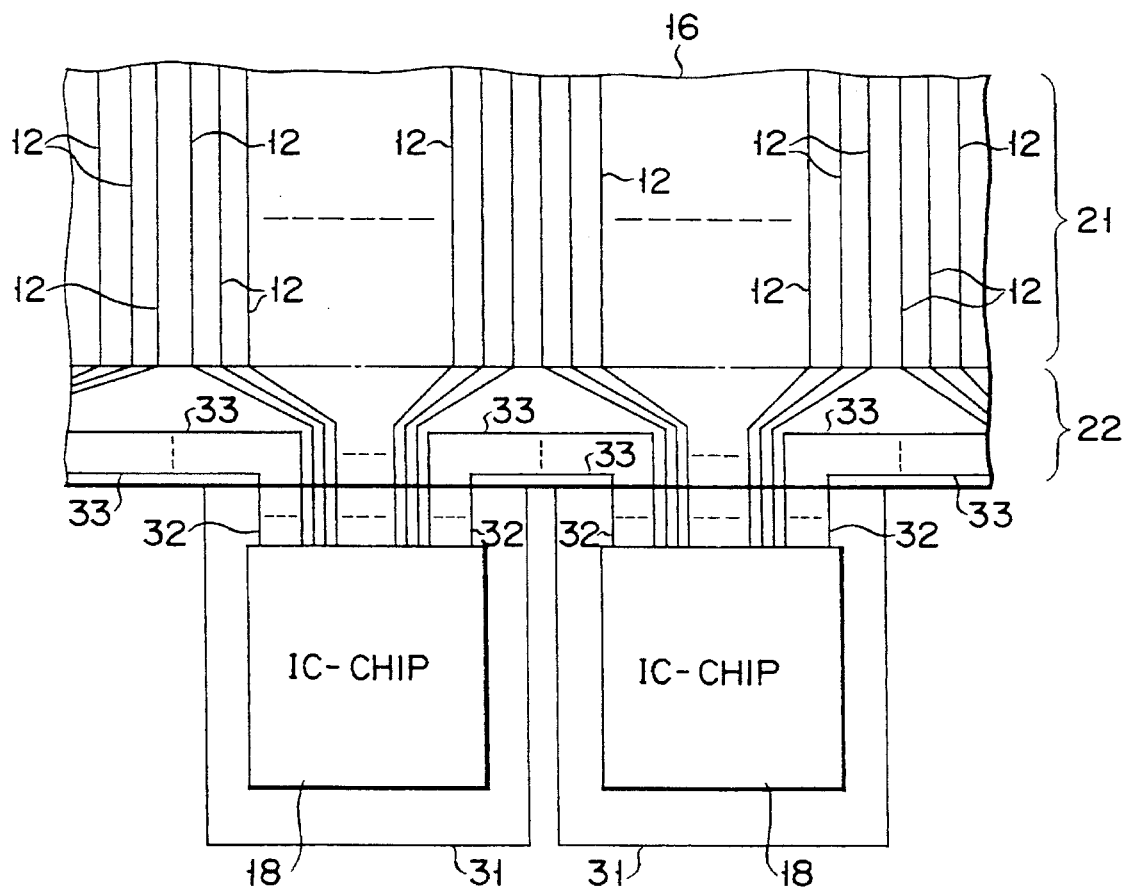
FIG. 4 is a front view showing the structure of a part of the liquid crystal display device shown in FIG. 2.

FIG. 4 is a view showing the structure of a part of the liquid crystal display device shown in FIG. 3. In FIG. 4, the structural elements which correspond to those shown in FIGS. 1–3 are denoted by the same reference numerals as those used in FIGS. 1–3, and explanations thereof will be omitted. In FIG. 4, reference numeral 31 represents TAB type insulating resin films to which the semiconductor integrated circuit chips 18 are fixed. Reference numeral 32 denotes wirings arranged on the insulating resin films and which form the wiring groups 23 and 25. Reference numeral 33 indicates wirings provided on the liquid crystal display panel 16 and which form the wiring group 26. In practice, openings are formed one in each of the TAB type insulating resin films, and the semiconductor IC chips are mounted in their corresponding openings.

In the liquid crystal display device explained above, the liquid crystal driving IC chips 18 are connected to one another by the wiring groups 25 and 26. Employing this structure, the timing at which the IC chips are driven, etc., can be controlled without wirings on a printed circuit board being used as in a conventional liquid crystal display device, with the result that the need for a printed circuit board, which is necessary in a conventional liquid crystal display device, is eliminated, thus realizing a compact, thin, and light liquid crystal display device. Further, the elimination of the need for the printed circuit board results in a reduction in the number of parts used and makes unnecessary a process, which is conventionally performed, for coupling the liquid crystal driving IC chips and the printed circuit board to one another, thus reducing the cost of the device.

Moreover, electric characteristics such as signal delay in the wirings 12 and 14 of the display panel 16 can be evaluated from monitored electric characters such as signal delay in the wirings 33. In consideration of the electric characteristics monitored, the liquid crystal driving voltages applied to the display panel 16 can be optimized. Therefore, in the case where a plurality of liquid crystal display signals of the same type as that of the display panel 16 are manufactured, even if display panels having different operation characteristics should be produced due to, for example, the differences in the conditions under which those panels are manufactured, the differences in the operation characteristics can be minimized. Further, the matching between the liquid crystal display panels and their liquid crystal driving ICs can be optimized. Thus, high-performance liquid crystal display panels which are improved in terms of the quality of characters or images displayed can be attained.

Figure 5:
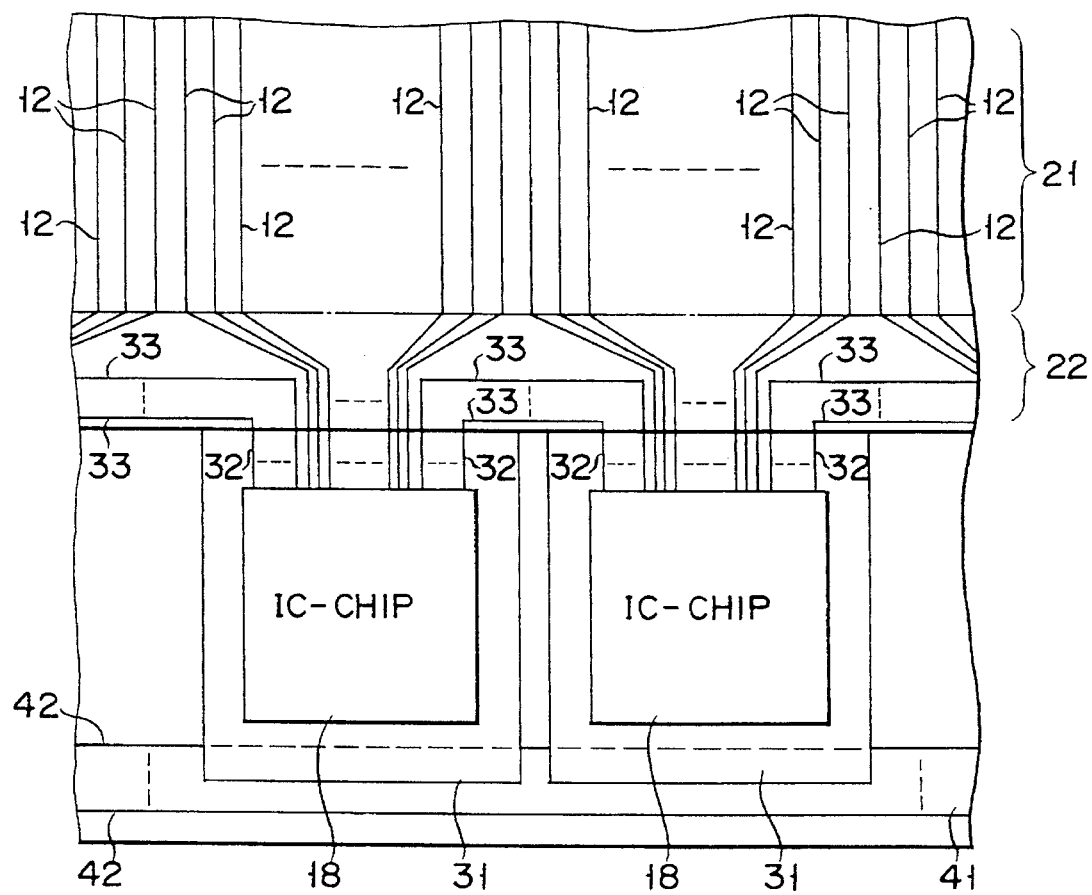
FIG. 5 is a front view showing the structure of a part of the liquid crystal display device according to a second embodiment of the present invention.

FIG. 5 is a view showing a part of the liquid crystal display device according to the second embodiment of the present invention. In the second embodiment, a printed circuit board 41 is provided around the liquid crystal display panel 16 as in a conventional liquid crystal display panel, and the insulating resin films 31 to which the semiconductor IC chips 18 are fixed are bonded onto the board 41.

A plurality of wirings 42 are formed on the board 41. In the first embodiment, various control signals and voltages are transmitted/applied through the wirings 32 and 33. In the second embodiment, one or more of the control signals and voltages are transmitted/applied via wirings 42. For example, a ground voltage of 0 V, a high voltage of 5 V for a logic operation, a high lighting voltage of 0 V for a liquid crystal drive, a high non-lighting voltage of −4 V for a liquid crystal drive, a low non-lighting voltage of −26 V for a liquid crystal drive, and a low lighting voltage of −30 V for a liquid crystal drive are applied through the wirings 42.

In the second embodiment, a printed circuit board is used as in a conventional liquid crystal display panel. However, one or more of the control signals and voltages to be transmitted between the semiconductor IC chips are transmitted through the wirings provided on the liquid crystal display panel 16. Adopting this technique, the printed circuit board 41 can be reduced in size, making it possible to form a compact liquid crystal display device.

Figure 6:
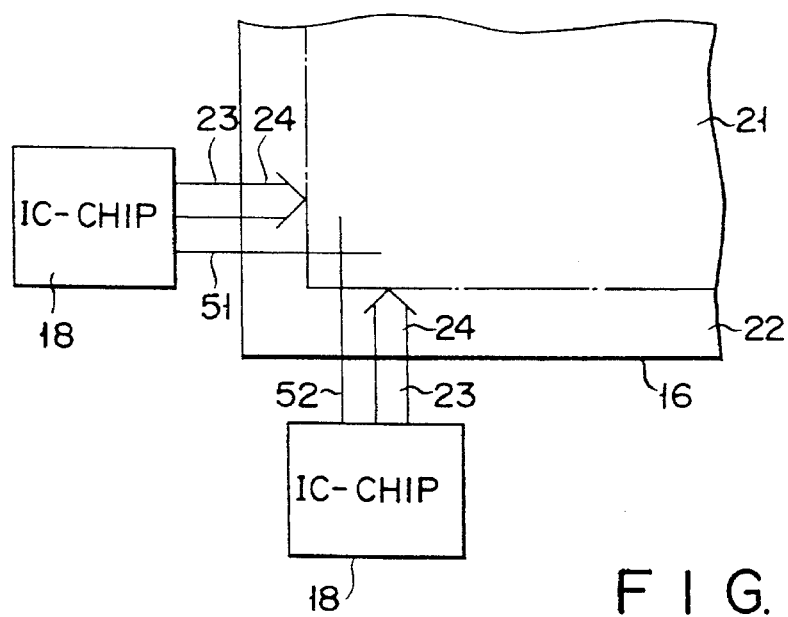
FIG. 6 is a front view showing the structure of a part of the liquid crystal display device according to a third embodiment of the present invention.

FIG. 6 is a schematic diagram of the liquid crystal display device according to the third embodiment of the present invention.

In the third embodiment, in addition to the wirings 12 and 14, a wiring 51 is formed on one of the two glass panels forming the liquid crystal display panel 16, and a wiring 52 is formed on the other of the two glass panels. In other words, the wirings 51 and 52 are formed such that they cross each other with the liquid crystal sandwiched therebetween. Each of these wirings 51 and 52 extends from an end portion of the panel up to the first region 21 in which the liquid crystal is provided.

Incidentally, each of the liquid crystal display pixels is equivalent to a capacitor. When the width of the wirings 51 and 52 is equal to that of the wirings 12 and 14, the capacitance existing between the wirings 51 and 52 is equal to the pixel capacitance. Accordingly, by electrically connecting the wirings 51 and 52 to the two semiconductor IC chips 18 and by incorporating a monitoring circuit in the IC chips 18, the characteristics of the display pixels can be monitored.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A liquid crystal display device comprising:

a liquid crystal display panel including a pair of glass panels equal to each other in size, said glass panels respectively having central portions between which a liquid crystal is sealed, and peripheral portions between which no liquid crystal is sealed, said liquid crystal display panel further including a plurality of optically-transparent driving wirings formed between said central portions of said glass panels, for conducting a liquid crystal-driving voltage;

a plurality of semiconductor chips each located around said liquid crystal display panel and each installed on a separate flexible film projecting from a peripheral portion of the glass panels, said semiconductor chips being electrically connected to said driving wirings of said liquid crystal display panel and supplying said liquid crystal-driving voltage to said driving wirings; and a plurality of first wirings formed on a peripheral portion of at least one of said glass panels, second wirings on each flexible film, connected to each semiconductor chip, and extending toward the liquid crystal display panel for connecting at least two of said semiconductor chips which are adjacent to each other, said first and second wirings thereby connecting all of said semiconductor chips in common via each of said semiconductor chips.

2. A liquid crystal display device according to claim 1, wherein said semiconductor chips are bonded onto said flexible film by a tape automated bonding (TAB) method.

3. A liquid crystal display device according to claim 1, wherein said first wirings formed on said glass panels transmit control signals including at least one of a shift clock signal, a frame signal, a latch signal, and a data signal.

4. A liquid crystal display device according to claim 1, wherein said first wirings formed on said glass panels have a power voltage applied thereto for driving each of said semiconductor chips.

* * * * *